United States Patent [19]

Huyer

[11] Patent Number: 5,028,090
[45] Date of Patent: Jul. 2, 1991

[54] OPEN ROOF CONSTRUCTION FOR A VEHICLE

[75] Inventor: Johannes N. Huyer, Velserbroek, Netherlands

[73] Assignee: Vermeulen-Hollandia Octrooien II B.V., Ea Haarlem, Netherlands

[21] Appl. No.: 354,928

[22] Filed: May 22, 1989

[30] Foreign Application Priority Data

May 27, 1988 [NL] Netherlands ............... 8801359

[51] Int. Cl.$^5$ .................... B60J 7/05; B60J 7/185
[52] U.S. Cl. .................... 296/221; 296/223; 296/224
[58] Field of Search ................... 296/221-224

[56] References Cited

U.S. PATENT DOCUMENTS

| 4,566,730 | 1/1986 | Knabe et al. | 296/221 |
| 4,643,478 | 2/1987 | Boots | 296/221 |
| 4,669,421 | 10/1987 | Schaetzler et al. | 296/221 |

FOREIGN PATENT DOCUMENTS

62-0210124 9/1987 Japan .................... 296/223

Primary Examiner—Dennis H. Pedder
Attorney, Agent, or Firm—Kinney & Lange

[57] ABSTRACT

An open roof construction for a vehicle having a roof opening (1), comprises a panel (3) movable between its closed position in the roof opening (1) and an upwardly tilted or backwardly slid opened position. For adjusting the panel (3), on at least one side a pull-and-push linkage (4) engages an adjusting mechanism (5) comprising a lifter (9) adjustable in height and displaceable in a stationary guide rail (6). The lifter (9) has an upper portion at least pivotally engaging the panel (3) by a transverse pivot shaft (30). At least a part (10, 11) of the lifter (9) is locked against a sliding motion either with respect to the pull-and-push means (4) or with respect to the stationary guide rail (6) by a locking cam (26) during part of the adjusting movement of the lifter (9). According to the invention the locking cam (26) is provided on a separate auxiliary element (13) engaging said part (10, 11) of the lifter (9). The auxiliary element (13) comprises a forcing guide (23, 25) controlled by the pull-and-push linkage (4), the forcing guide (23, 25) being adapted to move the auxiliary element (13) between a locking position and a releasing position.

5 Claims, 6 Drawing Sheets fig.1

OPEN ROOF CONSTRUCTION FOR A VEHICLE

The invention relates to an open roof construction for a vehicle having a roof opening, comprising a panel movable between its closed position in the roofopening and an upwardly tilted and/or backwardly slid opened position, wherein, for adjusting the panel, on at least one side a pull-and-push means engages an adjusting mechanism comprising lifter means adjustable in height and displaceable in a stationary guiding rail, the lifter means having its upper portion at least pivotally engaging the panel by a transverse pivot shaft, and wherein at least a part of the lifter means is locked against a sliding motion either with respect to the pull-and-push means or with respect to the stationary guide rail by a locking means during part of the adjusting movement of the lifter means.

In known embodiments of such open roof construction constructed as a tilt-sliding roof the locking means is formed at the lower end of a lifting lever in case the lifter means consists of a single lifting lever, or at the lower end of one or each leg of a link in case the lifter means consists of a link having two legs. In said cases the locking means consists of a cam having the configuration of a circular section and co-operating with a complementary shaped counter means on a control element connected to the pull-and-push means. The locking action of the lifting lever of one of the legs of the link is caused by the lifting lever or the respective leg pivoting about such an angle that the locking means has come into engagement with the counter means. During this operation the locking means comes gradually into engagement with the counter means such that a substantial pivoting angle should be passed by the lifting lever or the like before a full locking action is obtained. This graduate locking action, and of course also an unlocking action, results in inactive pivoting movements of the lifter means adversely affecting the built-in height of the open roof construction, or causing failures in the adjusting mechanism during the graduate (un)locking operation, since the lock which is not (yet) complete is broken due to large impacts of forces on the lifter means.

It is an object of the present invention to provide and open roof construction of the type mentioned in the preamble, wherein this disadvantages are removed in an effective way.

For this purpose the open roof construction according to the invention is characterized in that the locking means is provided on a separate auxiliary element engaging said part of the lifter means, the auxiliary element comprising a forcing guide controlled by the pull-and-push means, the forcing guide being adapted to move the auxiliary element between a locking position and a releasing position.

This feature enables the locking and unlocking operation of said part of the lifter means to take place during a very small adjusting movement of the lifter means since the locking means on the auxiliary element is actuated by the forcing guide controlled by the pull and push means independently of the movement of the lifter means.

It is advantageously if the auxiliary element is a locking arm pivotable about a transverse pivot shaft, while this locking arm preferably comprises on its end facing away from its pivot shaft a locking cam being adapted to engage into a recess in a control element of the pull and push means or in the stationary guide.

A favourable embodiment of the open roof construction according to the invention is characterized in that the forcing guide comprises a transverse guide pin formed on the auxiliary element and being in engagement with a guide slot provided either in an element connected to the pull and push means or in the stationary guide each of which is an associated supporting member for the auxiliary element and extending at least partially in vertical direction in order to move the auxiliary element between the locking position and the releasing position.

In this way there is obtained a reliable structure optimally designed for the desired function.

In the embodiment of the open roof construction wherein the lifter means comprises a link having two legs, of which the first leg is pivotally connected to the panel and is provided with a further guide pin, and of Which the second leg is pivotally connected to the first leg between both ends thereof by means of a transverse pivot shaft, it is advantageously if the auxiliary element is pivotally connected to the lower end of one of the legs of the link.

As a consequence a stable locking of one or both legs of the link is possible.

The invention will hereafter be elucidated with reference to the drawing showing a number of embodiments of the invention by way of example.

Figure 1:
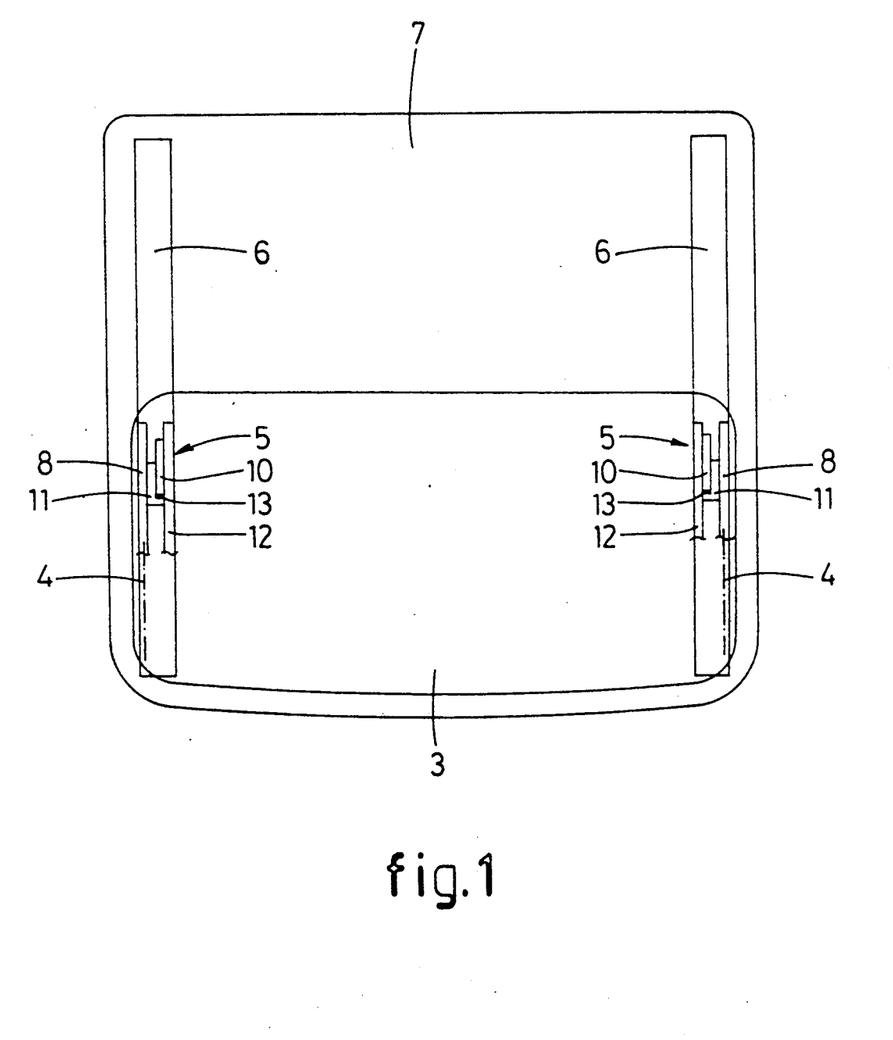
FIG. 1 is a schematic plan view of an open roof construction according to the invention.
Figure 2:
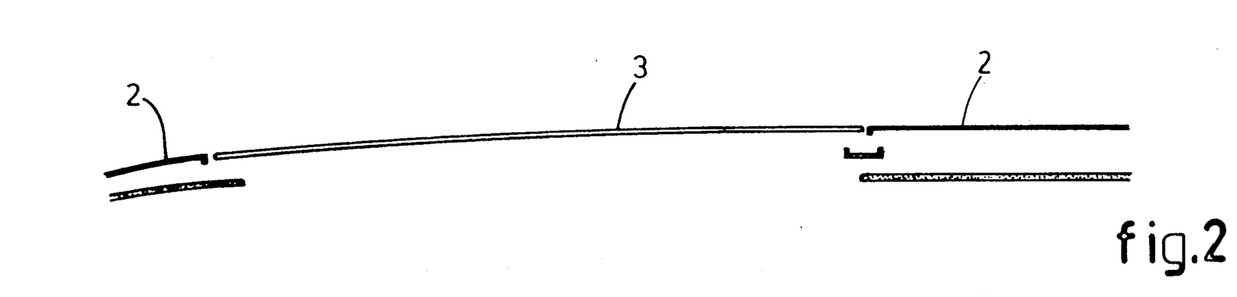
FIG. 2-4 are very schematic longitudinal sectional views of the open roof construction of FIG. 1 on an enlarged scale, wherein several positions of the panel are illustrated.
Figure 3:
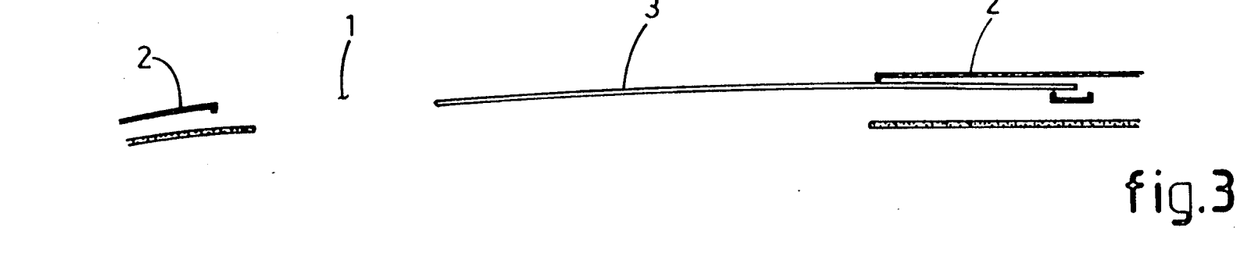
Figure 4:
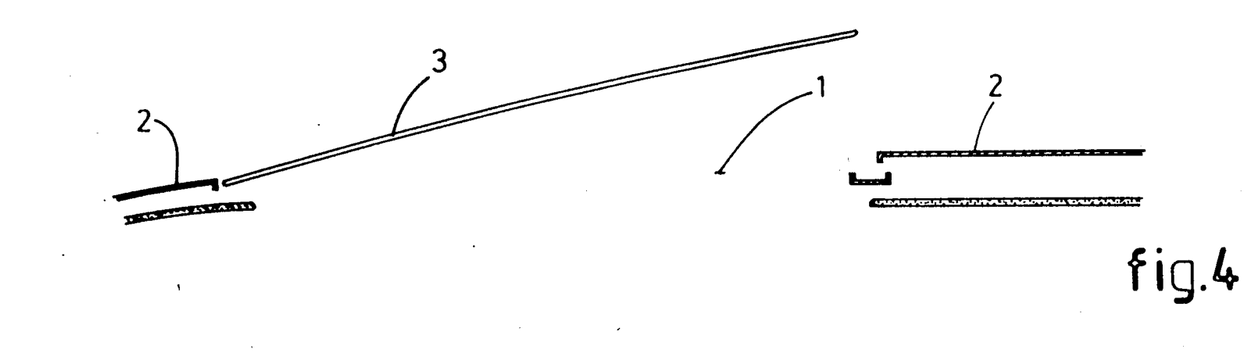

FIG. 1-4 show a tilt-sliding roof-type open roof construction for a vehicle having a roof opening 1 in the fixed roof 2. The open roof construction comprises a panel 3 being adapted to be moved from the closed position in the roof opening 1 (FIG. 2) into a backwardly and downwardly inclined position in which the panel 3 is slidable below the fixed roof 1 to a wholly or a partly opened position (FIG. 3) and may be returned from there to the closed position. The panel 3 may also be tilted from the closed position into a backwardly and upwardly inclined venting position (FIG. 4) and returned from this venting position to the closed position. In FIG. 1 it is shown that for adjusting the panel 3 on either side thereof a pull-and-push means 4 engages an adjusting mechanism 5 being guided in a stationary substantially horizontal guide rail 6 extending in longitudinal direction of the vehicle and being mounted on a stationary frame 7. Both pull and push means 4 are driven in a conventional way, such as by means of an electric motor or a manual crank (not shown).

Figure 5:
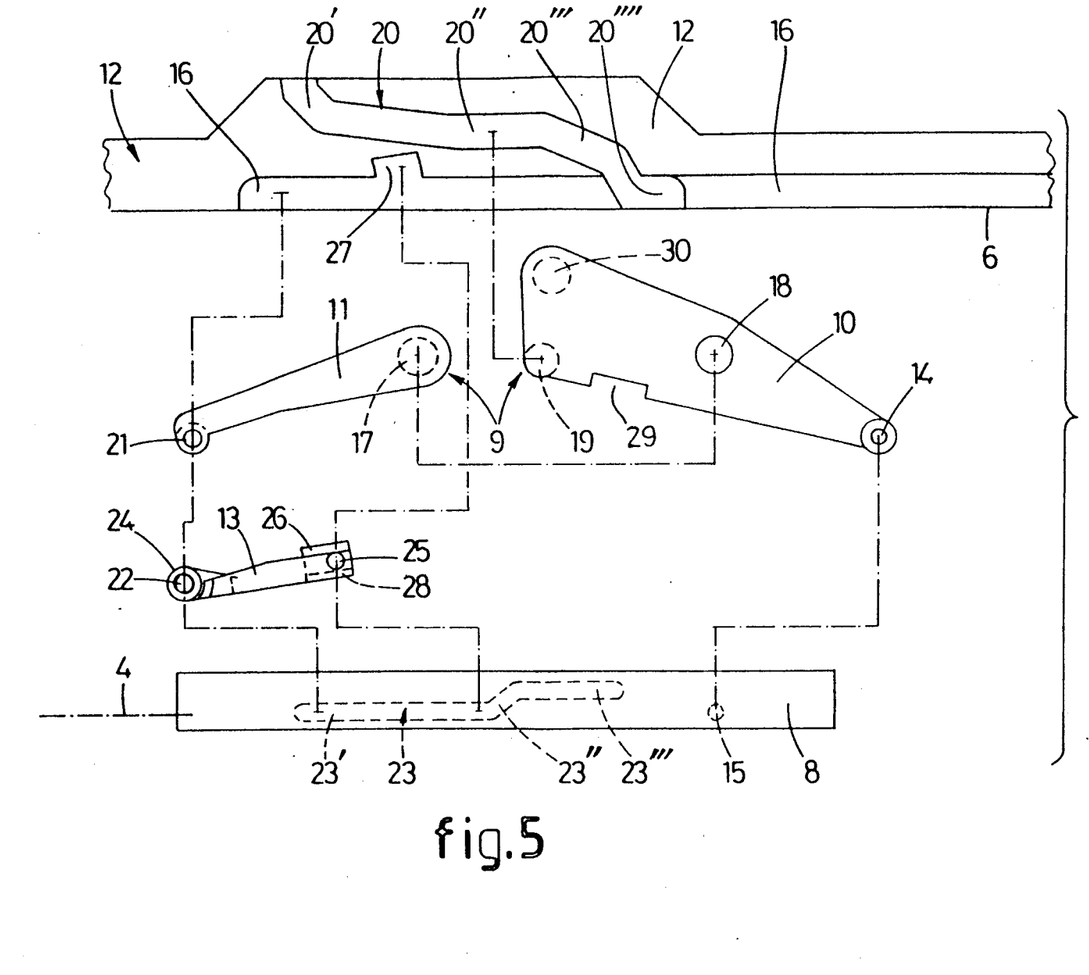
FIG. 5 shows an exploded side view of the parts of an embodiment of the adjusting mechanism of the open roof construction of FIG. 1 on an enlarged scale.

FIG. 5 shows the several parts of the adjusting mechanism 5 loose from each other. The above pull-and-push means 4 is provided with a drive plate 8. Furthermore, the adjusting mechanism 5 comprises a link 9 having a first leg 10 and a second leg 11, a control element or slide plate 12 and a locking arm 13. The drive plate 8 and the first leg 10 of the link 9 are pivotally connected to each other by means of a transverse pivot pin 14 formed at the lower end of the first leg 10 and being received rotatably in a hole 15 in the drive plate 8. Herein, it is possible that the pivot pin 14 projects from both sides of the first leg 10 and being supported on both sides in the drive plate so that there is provided a stable support of the first leg 10. On the other hand, it is possible to guide a cam, which is aligned with the pivot pin 14 and projects in a direction to the control element 12, in a slot 16 formed by the control element 12 and the stationary guide rail 6. In the former case the drive plate 8 will be guided in the slot 16.

The first leg 10 and the second leg 11 are connected to each other due to the fact that in the neighbourhood of its upper end the second leg 11 pivotally engages the first leg 10 between both ends thereof by means of the transverse hinge 17, 18.

The movement of the first leg 10 is controlled by the drive plate 12, for which purpose a guide cam 19, which is formed near the upper end of the first leg 10 and extends in a direction to the slide plate 12, engages in a guide slot 20 formed in the slide plate 12. The depth of the guide slot 20 in the slide plate 12 is larger than that of the slot 16 such that the guide cam 19 is stopped at the lower end of the guide slot 20 and cannot enter the slot 16. The guide slot 20 is open at the upper front end so that the guide cam 19 can leave and enter the guide slot 20 there. The guide slot 20 has in principal four portions: a forwardly and upwardly inclined front portion 20', a horizontal clearance portion 20", a forwardly and upwardly inclined portion 20'" connecting to the rear end thereof, and a horizontal rear locking portion 20''''. The front portion 20' of the guide slot 20 is passed by the guide cam 19 on the first leg 10 during the tilting movement of the panel 3 in the venting position, and the clearance portion 20" serving as free movement for the guide cam 19 in the closed position of the panel 3. The guide cam 20 passes the portion 20'" of the guide cam 20 when the panel 3 is tilted between the closed position and the downwardly displaced position, and the guide cam 19 being in the locking portion 20'''' of the guide cam 20 with the panel in the downwardly displaced position whereby an undesired upward tilting movement of the panel 3 is prevented.

The locking arm 13 and the second leg 11 of the link 9 are pivotally connected at their lower front end by means of a pin 21 formed on the second leg 11 and projecting towards the slide plate 12, the pin 21 rotatably engaging in a hole 22 provided in the locking arm 13. The pin 21 also projects from the side of the second leg 11 facing the drive plate 8 and is rotatably and slidably received there in a guide slot 23 in the drive plate 8.

The locking arm 13 further has a cam 24 at its lower end being arranged concentrically about the hole 22 and projecting towards the slide plate 12, the cam 24 rotatably and slidably engaging in the slot 16 in the slide plate 12. At the rear end of the locking arm 13 on the side of the drive plate 8 there is formed a transverse guide pin 25 projecting into said guide slot 23 in the drive plate 8. Near the guide pin 25 but on the other side of the locking arm 13 there is formed a substantially rectangular, upwardly projection locking cam 26 being able to engage into the slot 16 as well as into a recess 27 provided above this slot 16 and debouching therein.

The locking cam 26 is connected to the locking arm 13 by means of a transverse connection 28. In the lower position of the first leg 10 said transverse connection 28 is received with play in a recess 29 formed in the first leg 10.

The closed guide slot 23 in the drive plate 8 has three portions: a horizontal front portion 23', a central portion 23" connecting to the rear end thereof and inclining backwardly and upwardly, preferably with an angle of 45° to the horizontal, and a horizontal rear portion 23'" connecting to the rear end of the central portion 23".

Said connection between the adjusting mechanism 5 and the panel (not shown) takes place by means of a transverse pivot shaft 30 provided on the upper end of the first leg 10 of the link 9 and connecting the first leg 10 to the panel in a pivotal and sliding manner.

FIG. 6–9 show the operation of the adjusting mechanism of the open roof construction.

Figure 6:
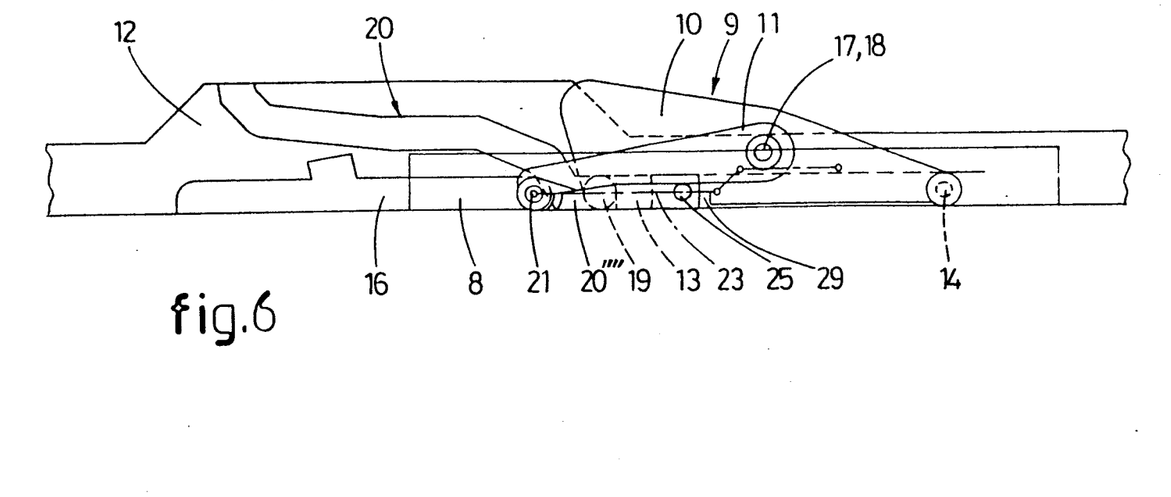
FIG. 6-9 show the adjusting mechanism of FIG. 5 in different positions.

In FIG. 6 the adjusting mechanism is in a position in which the panel is tilted maximally downwardly so that the panel is able to be slid backwardly below the fixed roof to a wholly of partially opened position, and forwardly again. Both legs 10 and 11 of the link 9 are pivoted maximally downwardly. The guide cam 19 of the first leg 10 is in the locking portion 20'''' of the guide slot 20 in the slide plate 12. During the sliding motions of the panel 3 the link 9 and the slide plate 12 are integrally with each other so that, when the pull-and-push means 4 connected with the pivot pin 14 of the first leg 10 of the link 9 through the drive plate 8 is adjusted, the slide plate 12 slides together with it. In the front position of the panel 3 in which it is lying under the roof opening 1 the slide plate 12 is locked to the stationary guide rail 6 in a manner not shown, so that it remains stationary when the link 9 is displaced further forwardly. Consequently a relative displacement between the link 9 and the slide plate 12 takes place.

Figure 7:
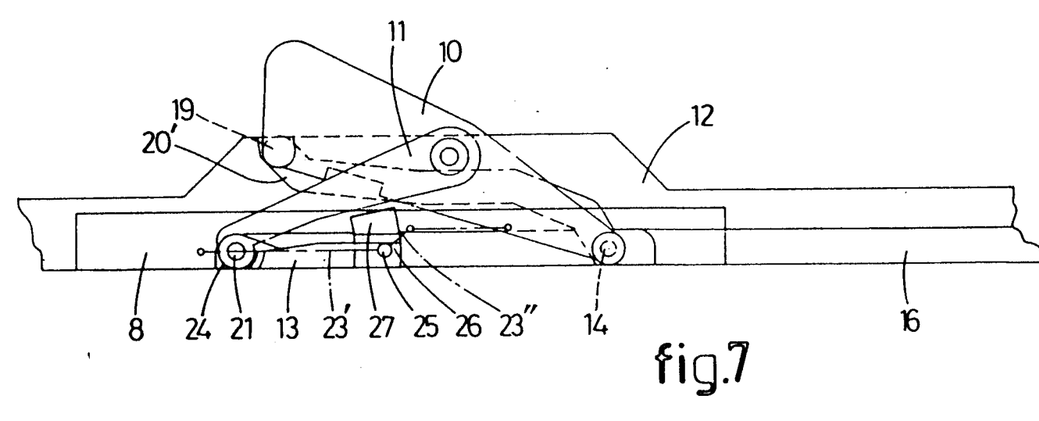

In FIG. 7 it can be seen that the link 9 is displaced a distance with respect to the slide plate 12 by the drive plate 8. Herein, the guide cam 19 at the first leg 10 of the link 9 is moved out of the locking portion 20'''' and through the several portions 20''', 20", and 20' of the guide slot 20, whereby the first leg 10 is pivoted upwardly and the panel 3 is tilted from its lower position upwardly. During the passage of cam 19 through the slot portion 20'" the panel 3 is moved between the lower position and the closed position. The horizontal slot portion 20" offers a free movement to the guide cam 19 and consequently to the link 9 in the closed position of the panel 3, and when the guide cam 19 passes through the slot portion 20' the panel 3 is started to tilt in order to bring it to the venting position. During said sliding movements of the guide cam 19 through the guide slot 20 the pivoting movement of the link 9 is determined fully by the position of the guide cam 19 in the guide slot 20.

With the pivoting movement of the first leg 10 of the link 9 the second leg 11 is forced to pivot along. For this purpose it is necessary for the lower ends of both legs 10 and 11 to move towards each other which is made possible since the pin 21 at the lower end of the second leg 11 is received freely slidable in the slot portion 23' of the guide slot 23.

In FIG. 7, the cam 24 on the locking arm 13 has completely passed through the slot 16 of the slide plate 12 and has reached the front end thereof, so that from that moment on the pin 21 at the lower end of the second leg 11 can not be slid further and the second leg 11 and the locking arm 13 can only pivot about the pin 21.

At that moment the guide pin 25 on the locking arm 13 has reached the transition between the front slot portion 23' and the central slot portion 23" of the guide slot 23 in the drive plate 8. When the drive plate 8 is slid further forwardly from this position the guide pin 25 will be forced to pass the central inclined slot portion 23", while the locking arm 13 is pivoting about the pin 21 on the second leg 11. As a result the locking cam 26 is moved upwardly into the recess 27 in the slide plate 12 so that the locking arm 13 and consequently the second leg 11 of the link 9 are locked against a sliding movement with respect to the slide plate 12. This locking action takes place during a very small sliding movement of the drive plate 8 and therefore during a very small pivoting movement of the first and second legs 10, 11 of the link 9.

Figure 8:
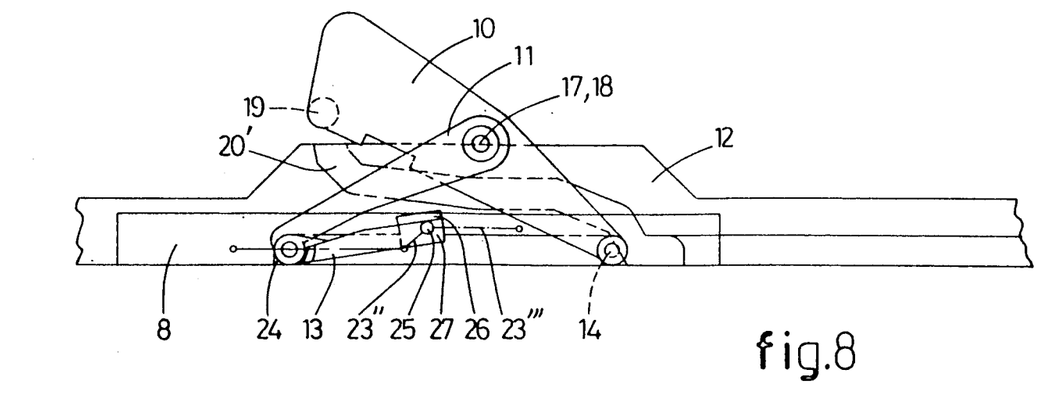

Turning to FIG. 8, the guide pin 25 has reached the transition between the central inclined slot portion 23" and the horizontal rear slot portion 23''', and the locking cam 26 has reached its end position in the recess 27 in the slide plate 12. The guide cam 19 on the first leg 10 of the link 9 has already left the guide slot 20 through the open upper end so that the movement of the first leg 10 is then determined by the triangular connection of the pivot pin 14, the hinge 17, 18 and the pin 21 of the second leg 11, the second leg 11 and the drive plate 8, respectively.

Figure 9:
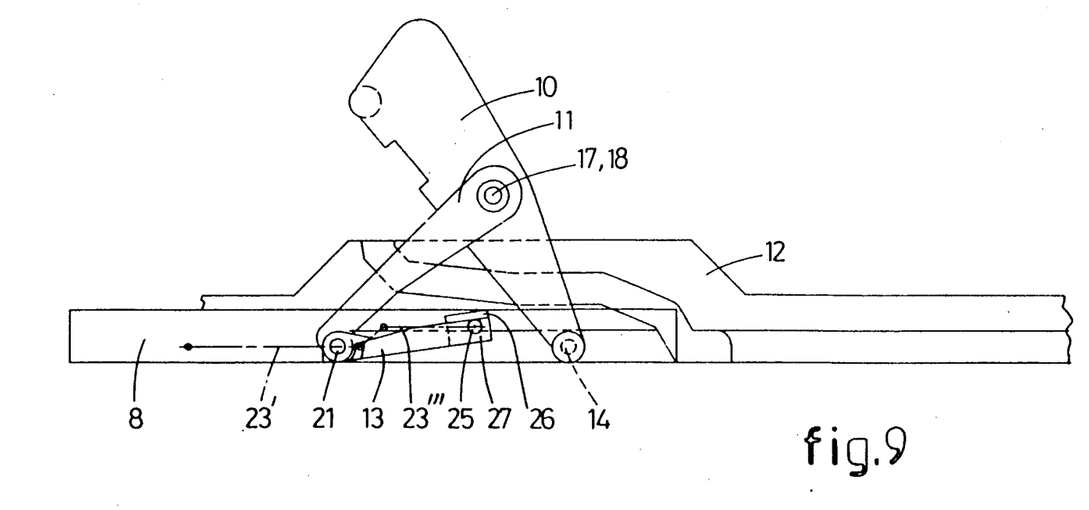

FIG. 9 shows the maximally upwardly pivoted position of the legs 10, 11 of the link 9. In this position the drive plate 8 is slid forwardly to such an extent that the guide pin 25 of the locking arm 13 has come into engagement with the rear end of the rear slot portion 23''' of the guide slot 23.

The return movement of the adjusting mechanism takes place in reverse sense. It can be added that the unlocking of the second leg 11 of the link 9 by means of the locking arm 13 occurs immediately after the guide cam 19 has come into engagement with the front portion 20' of the guide slot 20 in the slide plate 12. Consequently there is always a certain engagement of the guide cam 19 in the guide slot 20 and with this it is prevented that, due to a too early unlocking of the second leg 11, the guide cam 19 misses the guide slot 20 and the adjusting mechanism 5 gets stuck. This late locking action according to the invention is possible because the unlocking movement occurs very quickly and during a very small pivoting movement of the first leg 10 as a result of the separately operated locking arm 13.

Figure 10:
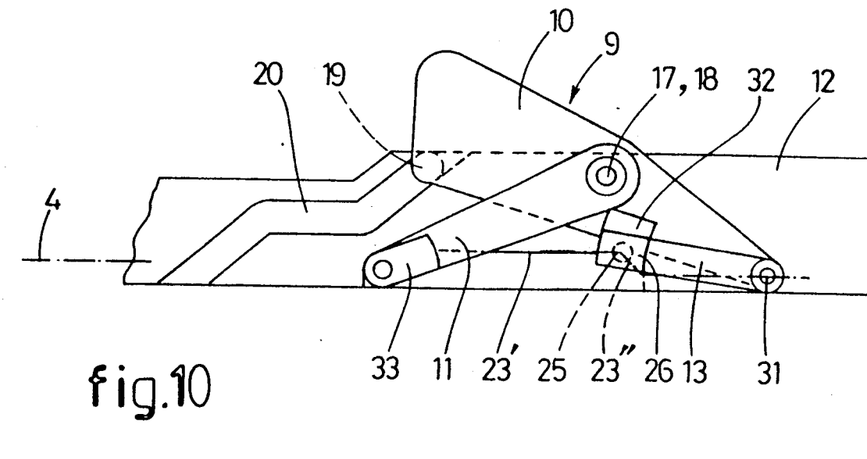
FIG. 10 and 11 show two further embodiments of the adjusting mechanism of the open roof construction according to the invention by way of example.

FIG. 10 shows an alternative embodiment of the adjusting mechanism according to the invention. The link 9 and the slide plate 12 thereof are constructed in the manner according to the Dutch patent application 8301608 incorporated herein by reference. In this embodiment the driving operation takes place by means of the slide plate 12 which is engaged by the pull and push means 4 (not shown). The locking arm 13 is pivotally connected at its lower rear end to the lower end of the first leg 10 by means of a transverse pin 31. In this embodiment the guide slot 23 is formed in the stationary guide (not shown) and is formed in a mirror image about a transverse plane compared to the guide slot 23 of the embodiment according to FIG. 5-9. In this case, the locking arm 13 serves for locking the first leg 10 of the link 9 against a sliding displacement with respect to the slide plate 12 during the pivoting movement of the first leg 10 while the guide cam 19 has come out of engagement with the guide slot 20. In the position of the adjusting mechanism shown in FIG. 10 the guide pin 25 of the locking arm is just at the transition between the forward and central portions 23' and 23" of the guide slot 23 in the stationary guide. When the slide plate 12 is moved further forwardly the guide pin 25 and consequently the locking arm 13 are urged downwardly, and the locking cam 26 being moved from a recess 32 in the first leg into a recess (not shown) in the slide plate 12, so that the locking arm 13 and the first leg 10 of the link 9 are locked against sliding movements with respect to the slide plate 12 and consequently the first leg 10 can only pivot about the transverse pin 31.

Figure 11:
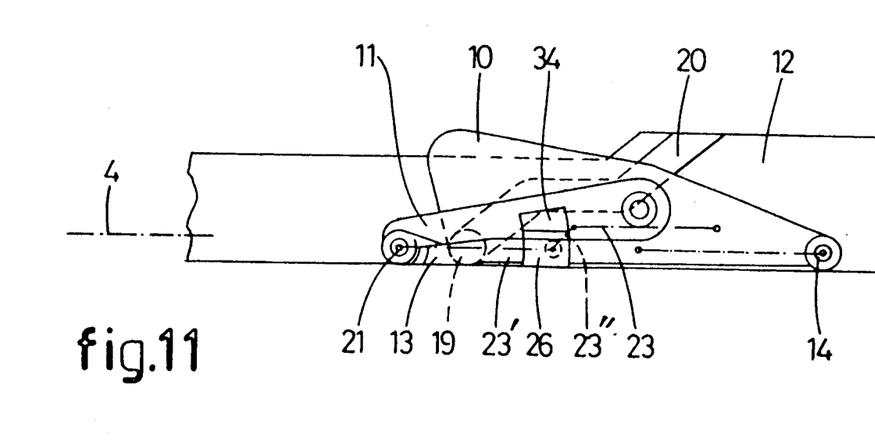

FIG. 11 shows still another modified embodiment of the adjusting mechanism according to the invention. Herein the locking arm 13 operated by the forcing guide is meant to displace a locking cam 33 on the second leg 11 in the embodiment of FIG. 10, and the locking arm 13 serves to lock the second leg 11 against sliding motions with respect to the stationary guide. The guide slot 23 is formed in the slide plate 12 and has the same shape as the guide slot 23 in the embodiment of FIG. 5-9. For locking the second leg 11 the locking cam 26 moves into a recess (not shown) provided in the stationary guide, when the locking arm 13 is pivoted upwardly. A recess 34 in the second leg 11 can temporary receive the locking cam 26 when it is moved to the locking position and the second leg 11 is still in the lower position. From the moment that the second leg is locked the link with the leg 10, 11 is operated by the slide plate 12.

From the forgoing it will be clear that the invention provides an open roof construction of which the adjusting mechanism has a lifter means which is locked and unlocked during the adjusting movement in a very reliable and stable manner.

The invention is not restricted to the embodiments shown in the drawing and described herein before, which can be varied in different ways within the scope of the invention. For example, it will be obvious that the use of the invention is not limited to tilt-sliding roofs. The invention can also be used in other roofs, such as so called spoiler roofs.

I claim:

1. An open roof construction for a vehicle having a roof opening, comprising:
   a panel movable between a closed position in the roof opening and selectively to an upwardly tilted opened position and a backwardly slid opened position;
   a stationary guide rail on either longitudinal side of the roof opening;
   an adjusting mechanism for adjusting the position of the panel responsive to the actuation of a sliding actuating means, the adjusting mechanism including, lifter means adjustable in height and displaceable along the stationary guide rail;
   a slide plate associated with the lifter means and having a guide slot therein at least partially inclining in vertical direction;
   a guide pin on the lifter means engaging the guide slot in the slide plate during a first part of the movement of the sliding actuating means; and
   an auxiliary element separate from the lifter means and having locking means to lock at least a part of the lifter means against a sliding motion with respect to the slide plate during a second part of the adjusting movement of said lifter means, the auxiliary element being connected to slide with said part of the lifter means and having a locking mechanism controlled by the actuating means and adapted to move the auxiliary element between a locking position thereby locking the part of the lifter means to the slide plate, and a releasing position thereby releasing the lifter means as the actuating means is moved.

2. An open roof construction for a vehicle having a roof opening, comprising:
a panel movable between a closed position in the roof opening and selectively to an upwardly tilted opened position and backwardly slid opened position;
a stationary guide rail on either longitudinal side of the roof opening;
an adjusting mechanism for adjusting the position of the panel responsive to the actuation of an actuating means, the adjusting mechanism including, lifter means adjustable in height and displaceable along the stationary guide rail, the lifter means having its upper portion adapted to pivotally engage the panel by a transverse pivot shaft, the lifter means comprising a link having first and second legs, the first leg provided with a guide pin, and the second leg being pivotally connected at an upper end to the first leg between opposite ends of the first leg by means of a transverse pivot shaft; and
an auxiliary element separate from the lifter means and having locking means to lock the second leg of the lifter means against a sliding motion with respect to an associated supporting member during part of the adjusting movement of said lifter means, the auxiliary element being pivotally connected to a lower end of the second leg of the lifter means and having a locking mechanism controlled by actuating means and adapted to move the auxiliary element between a locking position locking the second leg of the lifter means, and a releasing position thereby releasing the second leg of the lifter means as the actuating means is moved.

3. An open roof construction for a vehicle having a roof opening, comprising:
a panel movable between a closed position in the roof opening and selectively to an upwardly tilted opened position and backwardly slid opened position;
a stationary guide rail on either longitudinal side of the roof opening;
an adjusting mechanism for adjusting the position of the panel responsive to the actuation of an actuating means, the adjusting mechanism including lifter means adjustable in height and displaceable along the stationary guide rail, the lifter means comprising a link having first and second legs, the first leg having a guide pin that engages a guide in the guide rail and an upper end of the second leg being connected to the first leg between opposite ends thereof by means of a transverse pivot shaft; and
an auxiliary element separate from the lifter means and having locking means to lock at least a part of the lifter means against a sliding motion with respect to an associated supporting member during part of the adjusting movement of said lifter means, the auxiliary element being pivotally connected to the lower end of one of the legs of the link to slide with said part of the lifter means and having a locking mechanism controlled by the actuating means and adapted to move the auxiliary element between a locking position thereby locking the part of the lifter means, and a releasing position thereby releasing the lifter means as the actuating means is moved, the actuating means comprising a push-and-pull means engaging the lower end of the first leg of the link, and the auxiliary element engaging a lower end of the second leg of the link.

4. An open roof construction for a vehicle having a roof opening, comprising:
a panel movable between a closed position in the roof opening and selectively to an upwardly tilted opened position and backwardly slid opened position;
a stationary guide rail on either longitudinal side of the roof opening;
an adjusting mechanism for adjusting the position of the panel responsive to the actuation of an actuating means, the adjusting mechanism including lifter means adjustable in height and displaceable along the stationary guide rail, the lifter means comprising a link having first and second legs, the first leg having a guide pin that engages a guide in the guide rail, and an upper end of the second leg being connected to the first leg between opposite ends thereof by a means of a transverse pivot shaft;
an auxiliary element separate from the lifter means and having locking means to lock at least a part of the lifter means against a sliding motion with respect to an associated supporting member during part of the adjusting movement of said lifter means, the auxiliary element being connected to slide with said part of the lifter means and having a locking mechanism controlled by the actuating means and adapted to move the auxiliary element between a locking position thereby locking the part of the lifter means, and a releasing position thereby releasing the lifter means as the actuating means is moved; the actuating means comprising a push-and-pull means having a drive plate that pivotally engages the lower end of the first leg of the link and the auxiliary element pivotally engaging a lower end of the second leg of the link; and
wherein the locking mechanism comprises a transverse guide pin formed on the auxiliary element and being in pivotal engagement with a guide slot provided in the drive plate, the drive plate being slidable relative to the auxiliary element to cause the guide pin to move in the guide slot, the guide slot extending at least partially in vertical direction in order to move the auxiliary element between the locking position and the releasing position.

5. An open roof construction as claimed in claim 1, wherein the guide slot is open at least at its upper end, the guide pin being in engagement with the guide slot during a part of a tilting movement of the panel and exiting the guide slot through the open end thereof during a subsequent part of the tilting movement, and the auxiliary element locking said part of the lifter means with respect to the slide plate when the guide pin has exited the guide slot.

* * * * *